United States Patent [19]
Callis et al.

[11] Patent Number: 4,842,670
[45] Date of Patent: Jun. 27, 1989

[54] MOLDED VACUUM BAG FOR DEBULKING AND AUTOCLAVING LAMINATES OF COMPLEX SHAPES

[75] Inventors: Richard A. Callis, Thousand Oaks, Calif.; Darryl G. James, Camarillo, both of Calif.

[73] Assignee: Northrop Corporation, Hawthorne, Calif.

[21] Appl. No.: 236,581

[22] Filed: Aug. 25, 1988

Related U.S. Application Data

[60] Division of Ser. No. 52,670, May 19, 1987, which is a continuation-in-part of Ser. No. 837,616, Mar. 7, 1986, abandoned.

[51] Int. Cl.⁴ ............................................. B32B 31/06
[52] U.S. Cl. .................................. 156/382; 156/285; 425/DIG. 60; 428/69
[58] Field of Search .............. 156/382, 285, 286, 242, 156/307.1; 264/308; 425/DIG. 60; 428/69

[56] References Cited

U.S. PATENT DOCUMENTS

| | | | |
|---|---|---|---|
| 1,566,665 | 11/1922 | Frost et al. | 156/287 X |
| 3,074,903 | 1/1963 | Fincke et al. | 156/329 X |
| 3,262,830 | 7/1966 | Vincent | 156/329 |
| 3,666,600 | 3/1969 | Yoshino | 156/285 |
| 4,125,526 | 11/1978 | McCready | 264/308 X |
| 4,664,737 | 5/1987 | Schlosstein | 156/285 |

OTHER PUBLICATIONS

"Use of High Strength RTV Silicone Rubber in Contour Vacuum Bag Molding" Dow Corning New Products Information, 5/3/83.

Primary Examiner—Michael W. Ball
Assistant Examiner—Michele K. Yoder
Attorney, Agent, or Firm—Terry J. Anderson; Robert B. Block

[57] ABSTRACT

Methods are disclosed for forming silicone rubber vacuum bag assemblies which can be used repeatedly to debulk and autoclave composite layups. These bags can be formed of a single layup of uncured silicone rubber over a tool of a simple shape or as a layup of uncured silicone rubber over the totality of the tool and a prepreg consisting of a fiber in uncured silicone rubber laid up over areas which do not include male and female radii on the tool. Additionally, a further bag can be constructed by removing those portions of a simple bag which overlay recesses and female radii followed by curing of the silicone rubber and filling of the recesses within uncured silicone rubber followed by a second cure period. Each of the vacuum bag assemblies of the invention is postcured preferredly removed from its defining tool so as to stabilize and fully shrink the silicone rubber. The vacuum bag assemblies are mounted in a silicone rubber membrane which is preferably then supported in a frame.

11 Claims, 5 Drawing Sheets

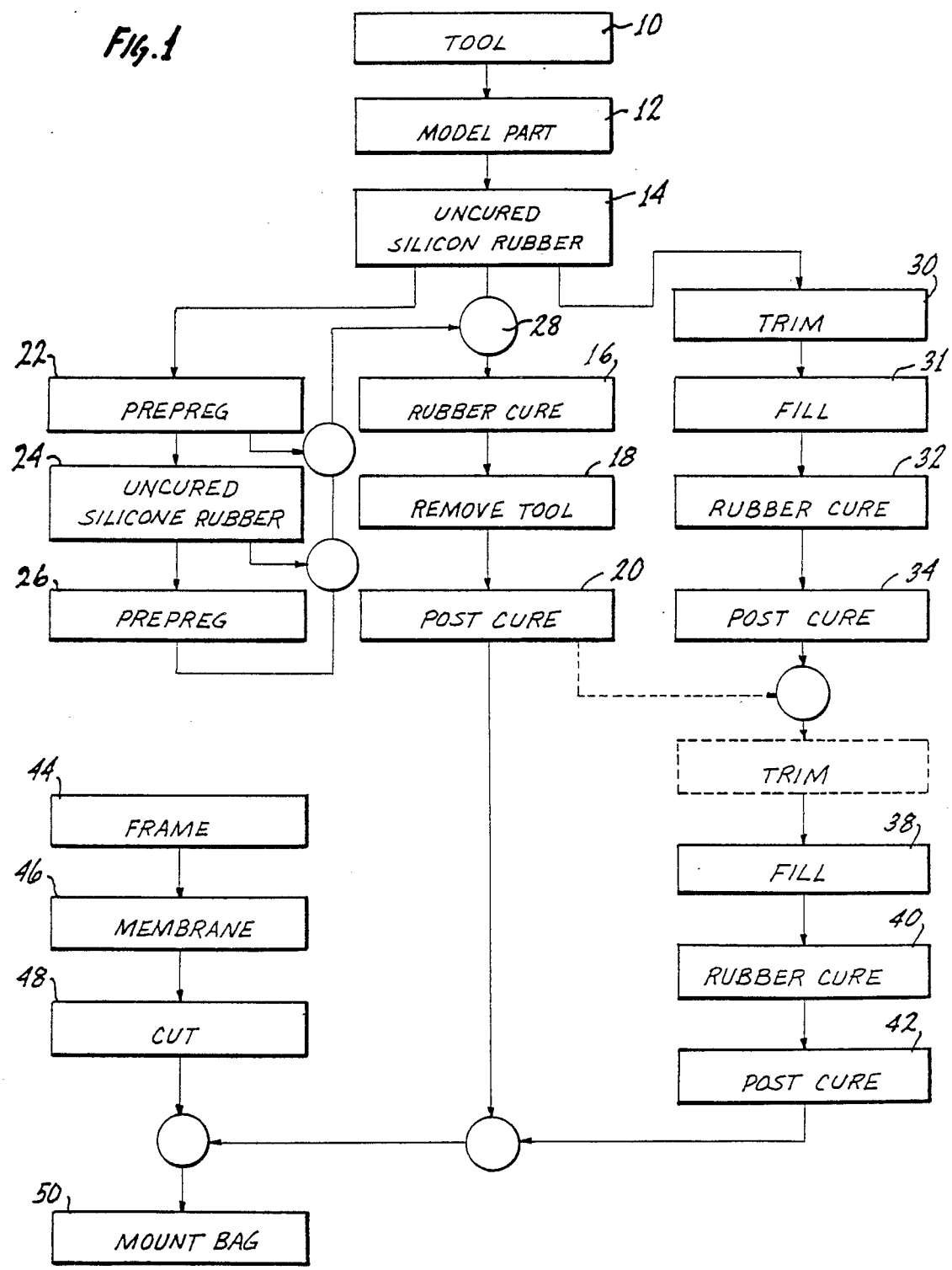

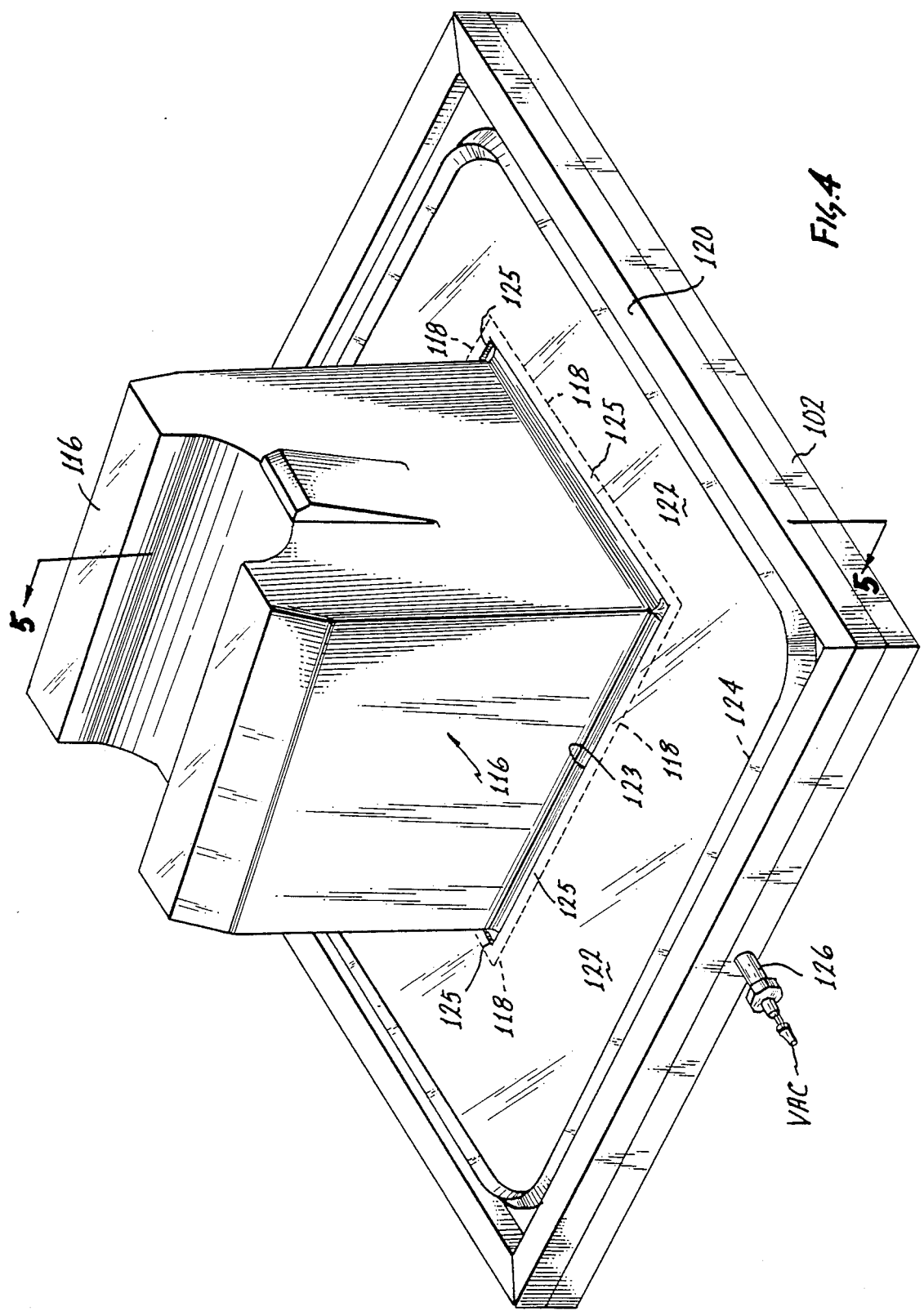

MOLDED VACUUM BAG FOR DEBULKING AND AUTOCLAVING LAMINATES OF COMPLEX SHAPES

CROSS REFERENCE TO RELATED APPLICATIONS

This application is a division of application Ser. No. 052,670, filed May 19, 1987, which is a continuationb-in-part of our application Ser. No. 837,616, filed Mar. 7, 1986, "now abandoned" entitled IMPROVED METHODS AND APPARATUS FOR DEBULKING AND AUTOCLAVING LAMINATES OF COMPLEX SHAPES, the entire of contents of which is herein incorporated by reference.

BACKGROUND OF THE INVENTION

Heretofore, plastic films such as nylon, have been and still are widely used for debulking and autoclave curing operations in composites manufacture as for instance see U.S. Pat. No. 3,666,600 (Yoshino) issued May 3, 1972. The forming of the film to closely fit into the corners and contours of complex shaped parts, however, is labor intensive and the results are rather variable. The film is usually laid over the composite layup on the tool and then hand conformed to the tool shape, and sealed with chromate putty about its periphery to the tool. The completely bagged part and tool is then autoclaved. The film is not reusable and is thrown away. Parts formed using this conventional film system have had a large number of wrinkles, bridging, pinholes and leaks due to edge sealing problems, all of which have contributed to limit the productivity of the film sealing system.

U.S. Pat. No. 4,125,526 (McCready) issued Nov. 14, 1978 suggests using polyurethane for vacuum blankets on radar domes, i.e a relatively smooth surfaces. Liquid polyurethane precursor compounds are sprayed onto the uncured components for forming the radar dome. This structure is then allowed to stand for a period of time to allow for polymerization of the precursor compounds into a polyurethane blanket followed by autoclaving to cure the radar dome materials into the resultant radar dome.

Reusable silicone rubber membranes and mechanical seals to replace the film and chromate are known from U.S. Pat. No. 2,837,453 (Englehart) issued June 3, 1958, U.S. Pat. No. 3,382,125 (Laudermild) issued May 7, 1968 and U.S. Pat. No. 4,287,015 (Danner) issued Sept. 1, 1981 which teach the use of a flexible silicone rubber blanket vaccum secured about the perimeter of the tool. The teachings of these patents work well enough for use on tooling which is of relatively flat conformation but becomes less and less satisfactory as the shape of the part to be laminated becomes more complex and incorporates reentrant portions or recesses and tight radius inside contours.

The use of an unshaped, highly stretchable silicone rubber membrane which is brought down over the tool and drawn to it with a vacuum so that the membrane elasticity permits it to conform to the desired shape has also been tried, but has not been successful on highly contoured shapes since resin buildup is formed in the contoured areas. This has lead to wrinkling and puckering in production parts.

While it has been proposed to make molded silicone bags by spraying up or brushing a silicone suspension dispersed in a solvent over the tool to form a silicone mold therefrom, the use of such has been limited to a few production cycles due principally to shrinkage. While reinforcement with fiberglass has been suggested to obtain a greater number of production life cycles, the reduced flexibility and delamination of the bag has limited the application of this concept. For a brief discussion of the above concept see Dow Corning's New Product Information Bulletin entitled "Use of High Strength RTV Silicone Rubber in Contour Vacuum Bag Molding" (1983).

In general, a principal limitation of the above molded bag concept is found to result from continuing and progressive shrinkage during each subsequent autoclave cycle, particularly when used on tools of complex, highly contoured shaped.

In view of the above it is evident that there exists a need for improved methods and apparatus for bagging laminates of complex shape for debulking and autoclave curing purposes.

SUMMARY OF THE INVENTION

In general, it is an object of the present invention to expand the usefulness of reusable membranes and bags made of silicone so as to make them applicable to production of composites of complex shapes.

In general, the present invention is predicated on the finding that a frame supporting a silicone rubber membrane can be combined with a molded silicone rubber bag made directly on a highly contoured tool shape. This is subsequently stabilized, the bag and membrane are assembled together through a cut-out provided in the membrane into which the molded bag is positioned and sealed to form a reusable unitary assembly.

For fabrication of the molded silicone rubber bag, a model part is usually fit on the tool before the bag is started. However, some male tools may have such low contours or contours of such small size that no model part is required since the resultant molded bag can be readily stretched to fit over these tools in subsequent assembly cycles.

For certain tools of a generally uncomplicated shape the bag is fabricated of calendared B-stage (uncured) silicone rubber sheet applied over the tool and a model part located on the tool. The tool, the model part and the uncured silicone rubber bag are then vacuum bagged with nylon film using conventional bagging techniques including sealing the nylon film to the tool with chromate putty. The nylon bagged assembly is then cured in an autoclave. The resulting silicone rubber bag is then removed from the tool and silicone rubber bag stabilized by being postcured in an oven at ambient pressure and at a temperature significantly higher than any temperature at which the bag will be subjected to during autoclaving of a component part with the bag. The bag is cured at this temperature for an extended period of time to complete all shrinkage and to stabilize the shape of the bag.

For bags of complex shape, further embodiments of the invention are utilized. In a first of these embodiments a composite bag is fabricated. This bag includes a layer of at least one sheet of calendared B-stage (uncured) silicone rubber applied over the tool and any model parts located on the tool. Next a prepreg of a fiber fabric or mat in uncured B-stage silicone rubber is applied over those portions of the tool which are relatively uncomplicated in shape. This excludes those portions of the tool which include highly contoured recesses, reentrant portions or undercuts or tight inside or outside radii. If the tool is large and it is desirable to utilize a thicker bag during curing of a component part on the tool, a further layer of calendared B-stage (uncured) silicone rubber sheet can be applied over the totality of the tool. Optionally, a further layer of the fiber/silicone rubber prepreg sheet can be applied over those areas containing the first layer of prepreg.

After the desired number of layers of the calendared B-stage (uncured) silicone rubber and fiber prepregs are built up, the assembly composed of the tool, the model part and the uncured silicone rubber bag is then vacuum bagged with nylon film using conventional bagging techniques and then sealed with chromate putty and curred in an autoclave.

This bag is then also removed from the tool and stabilized by being postcured in an oven at an ambient pressure and at a temperature which is significantly higher than any temperature it will be subjected to during autoclaving of a component part with the bag. This completes all shrinkage and stabilizes the shape of the bag.

This bag is particularly advantageous because the thickness of the bag at both inside and outside radii and at the edges of reentrant portions, undercut and the like is thinner than the remainder of the bag. This facilitates flexure of the bag during both loading onto a tool and demolding from the tool.

In a further bag which also includes highly recessed contours, reentrant portions or undercuts or tight inside radii, a bag is fabricated of calendared B-stage (uncured) silicone rubber sheets as described above. Either before being subjected to an autoclaving cycle or thereafter all tight inside radiuses and reentrant portions are cut-out and the edges chamfered toward the removed portions. If not already cured, the remaining portions of the bag are cured. The fully cured parts of the bag are then reassembled on the tool over the model part if present and all reentrant portions, recesses and inside radiuses are filled in level with B-stage (uncured) silicone rubber which may either be a paste or a strip of material as the configuration dictates. A further cap splice overlay of uncured silicone rubber is then applied over the filled in portions of the inside radiuses and recesses.

The entire assembly is then vacuum bagged with nylon film and again cured in an autoclave. After removal from the autoclave, the tool and model part, if used, are then removed and the rubber bag is stablized as above by a postcure for an extended period of time at ambient pressure at a temperature greater than the autoclaving temperature of any part which will be formed utilizing the bag. The stabilized bag is then bonded to a cut-out in a cured silicone rubber membrane which is mounted and supported in a rigid frame.

The bags of this invention are particularly advantageous because they are stabilized at a much higher temperature than the temperature at which they will be used during the debulking and curing a laminates of composite materials. Further, the bag which includes the fiber prepreg is particularly advantageous for use with composite shapes which heretofore were difficult to debulk and cure. This embodiment is particularly useful on shapes which include negatively drafted side walls or reentrant or undercut portions.

The mouths of the bags are additionally stabilized when they are mounted in a cut-out portion in a preshrunk membrane which in turn is mounted in a frame. This also facilitates the use of these bags in that the frames can be appropriately hinged to a support for the tool allowing for ease of layup of the uncured composite on the tool.

These elements combine to stabilize the above bag against further shrinkage. Further the bags, as formed in these processes of manufacture, conform well to their tools without the need for significant stretching. This is readily accomplished utilizing presently available materials by postcuring the bag into a relaxed state by removing the bag from the tool prior to the postcuring step.

These and other features and further objects of the invention will become apparent from the following detailed description and the claims.

BRIEF DESCRIPTION OF THE DRAWINGS

FIG. 1 is a flow chart illustrating the general methods of manufacture of silicone rubber debulking apparatuses for use in autoclave manufacture of complex laminates according to the present invention;

FIG. 4 is an isometric view showing a representative apparatus made in accordance with certain of the steps of FIG. 1;

DETAILED DESCRIPTION

FIG. 1 is a flow sheet of illustrative embodiments of methods of manufacture of premolded vacuum bag assemblies constructed in accordance with this invention.

Certain steps are utilized in each of the embodiments of the invention while other steps in the various embodiments differ from one another. Inherent in each of the embodiments of the invention is the use of a tool shown at step 10 of FIG. 1. The tool used at step 10 is overlaid with particular laminates of composite materials to form parts of these composite materials. A model part can be overlaid on the tool at step 12. Such a model part would be preformed and would generally exhibit all of the characteristics of the parts which are ultimately molded on the tool 10. The use of the model part is optional and generally depends upon the extent of the tool. If the laminate thickness is quite small, generally less than about 0.60", and the extent of the projection of the part is not too large, as for instance less than about 6 inches, the model part may be dispensed with and a vacuum bag assembly formed directly on a tool. If, however, the tool has extensive lateral projection or includes female radii, the shrinkage which would result from failure not to include a model part might be excessive, especially if the part thickness is substantial, and in these cases a model part should be included on the tool at step 12.

Figure 2A:
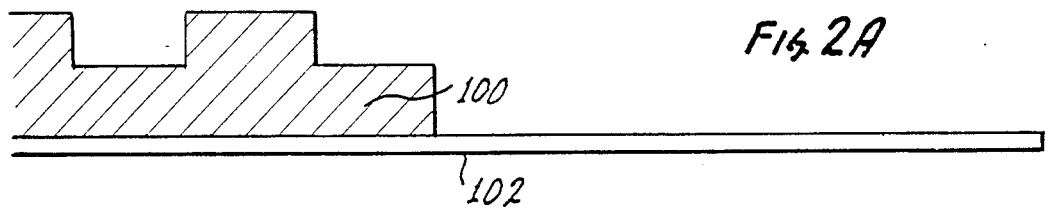
FIGS. 2A through 2F are sketches illustrating progressive steps in the manufacture of silicone rubber debulking apparatuses of the present invention.
Figure 2B:
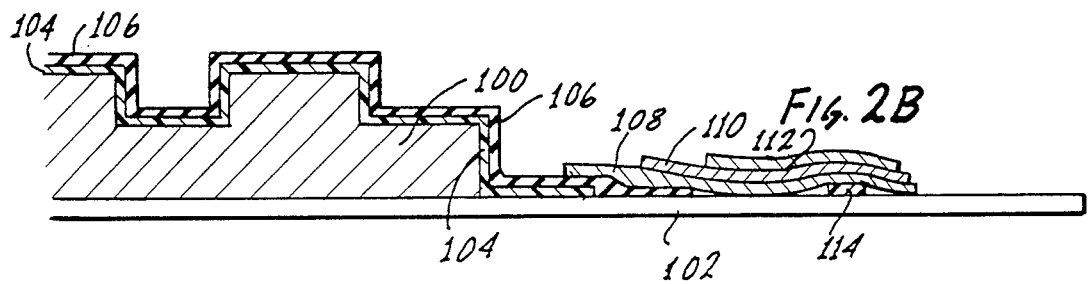

Referring now to FIG. 2A, a tool 100 is shown located on a base 102. In FIG. 2B a model part 104 has been positioned on the tool 100. Normally the tool base 102 is larger than the tool 100 and extends laterally away from the tool 100.

In FIG. 2B a layer 106 of uncured B-stage silicone rubber is laid over the model part 104. This corresponds to process step 14 of FIG. 1. Alternately if the model part 104 was not used, the uncured silicone layer 106 of the silicone rubber would directly overlay the tool 100. For simple tools, layup of the vacuum bag assembly of the invention is now complete and the assembly is prepared for curing of the layer 106 of silicone rubber.

Curing at step 16 of FIG. 1 is done in a conventional manner by applying a teflon film peel ply 108 over the totality of the layer of silicone rubber. Subsequently a breather ply 110 is layered over the teflon film ply 108. Finally, the structure is bagged with a conventional nylon film 112 which is sealed to the tool base 102 with a bead of chromate putty 114. For the purposes of illustration, only a portion of the structures 108, 110 and 112 are seen in FIG. 2B.

Curing of the uncured layer 106 of silicone rubber is effected by placing the bagged uncured silicone rubber mold and the tool 100 in an autoclave and curing at a suitable temperature as for instance at 350° F. for about 90 minutes at about 50 psi.

The nylon film 112 is then removed as are the breather ply 110 and the teflon film ply 108. The subsequent vacuum bag assembly is now removed from the tool 100. This is depicted at process step 18 of FIG. 1.

After removal from the tool 100, the vacuum bag assembly is then postcured at process step 20 of FIG. 1. Post curing is accomplished by positioning the vacuum bag assembly in an oven at ambient temperature and heating at an elevated temperature as for instance at about 400° F. for several hours to completely de-gas the cured silicone rubber and stabilize the same and to effect a complete preshrinkage of the vacuum bag assembly with respect to subsequent operational use during repeated use in forming composite parts in autoclaving operations.

Figure 5:
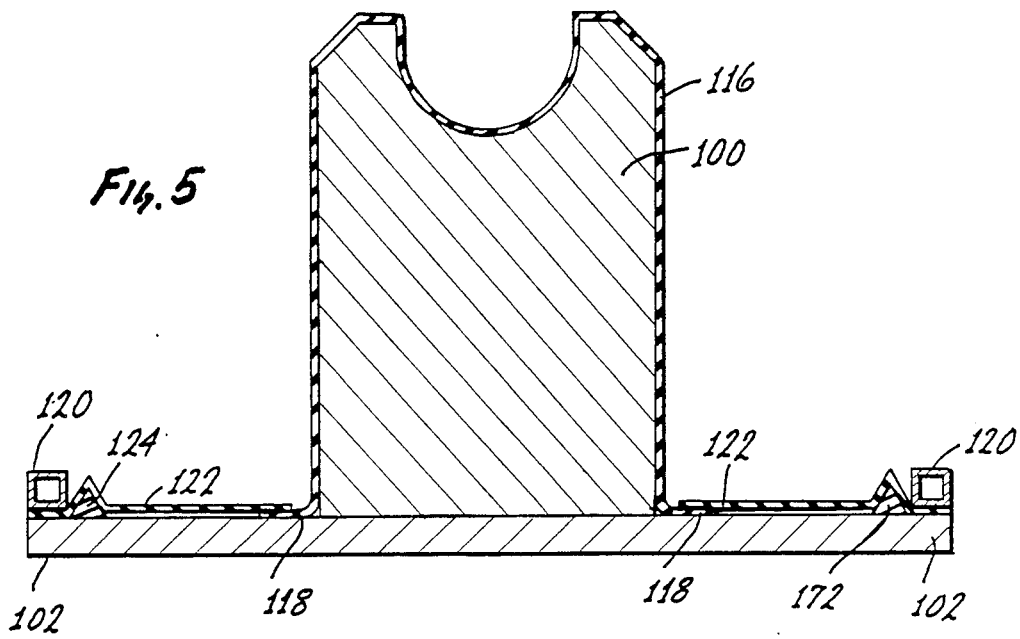
FIG. 5 is an elevational view in cross section about the line 5—5 of FIG. 4.

Referring now to FIGS. 4 and 5, after the postcure a vacuum bag assembly 116 has been formed which conforms to the tool 100 seen in cross section in FIG. 5. The vacuum bag assembly 116 was laid up on the tool 100 such that the layer 106 of uncured silicone rubber draped completely over the tool 100 and down onto the tool base 102 to form a flange 118 which extends completely around the vacuum bag assembly 116.

At process step 44 of FIG. 1 a frame 120 is constructed and a preshrunk silicone rubber membrane 122 is attached to the frame 120 at process step 46. An opening 123 sized to accept the vacuum bag assembly 116 is cut in the center of the silicone rubber membrane 122 at assembly step 48 of FIG. 1 and is passed over the vacuum bag assembly 116 of FIGS. 3 and 4. The edges 125 around the opening in the silicone rubber member 122 are then sealed to the flange 118 of the vacuum bag assembly 116 utilizing a suitable silicone rubber sealant such as an RTV silicone rubber sealant. This is completed at mounting step 50 of FIG. 1.

A silicone rubber extrusion 124 is located around the inside periphery of the frame 120 on the tool base 102. When the assembly consisting of the vacuum bag assembly 116, the silicone rubber member 122 and the frame 120 are mounted onto the tool 100 and its base 102 the rubber extrusions 124 forms a seal by stretching and intimately mating with the outside periphery of the silicone rubber member 122 where it meets with the frame 120. The assembly is completed by attaching a suitable vacuum fitting 126 shown attached near the periphery of the frame 120. Alternately the vacuum fitting 126 could be attached to the rubber membrane 122.

During use for repeatedly forming composite parts thereon, the laminates of the desired material for forming the part are overlaid on the tool 100. When the proper number of plies of the laminate have been laid onto the tool 100 the vacuum bag assembly 116 is pulled down over the composite of the laminated tool until the frame 120 rests on the tool base 102. Vacuum is then applied at the vacuum fitting 126 and the structure is ready to be placed in an autoclave for the maturation of the laminate materials which will ultimately form a part which will take the shape of the tool 100.

Figure 6:
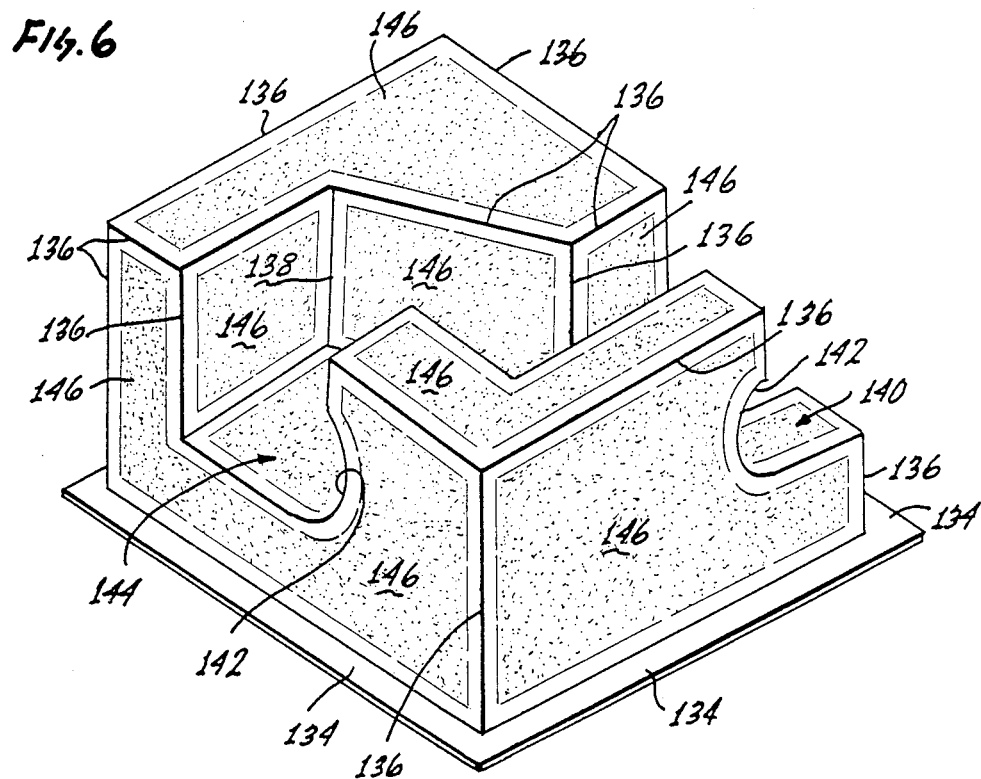
FIG. 6 is an isometric view of a preferred silicone rubber debulking apparatus for use in debulking complex component parts.

A preferred embodiment for use in debulking and autoclaving laminates having extremely complex shapes is shown in FIGS. 3 and 6. FIG. 3 shows representational views similar to FIG. 2 with an actual vacuum bag assembly 128 depicted in FIG. 6. For illustrative purposes in FIG. 3 the same representational tool 100 and tool base 102 have been used.

As was practiced in describing the above embodiment of FIG. 2, a layer 130 of uncured B-stage silicone rubber is draped over the tool 100 and the model part 104 located thereon. This corresponds to the process steps 10, 12 and 14 of FIG. 1 as described for the earlier embodiment. As described for the earlier embodiment at process step 16, the earlier embodiment was now subject to initial curing of silicone rubber. However, in the embodiment of FIG. 3, prior to the initial curing of the silicone rubber, a layer of glass fabric prepreg is positioned over certain portions of the silicone rubber layer 130.

The prepreg 132 consists of a glass fabric or mat which is intimately pre-impregnated with uncured silicone rubber. Generally for the vacuum bag assembly 128, the layer of the uncured silicone rubber 130 will be chosen as a layer of about 0.100 inches thick and the prepreg 132 will be chosen as a layer of about 0.015 inches thick.

Figure 3A:
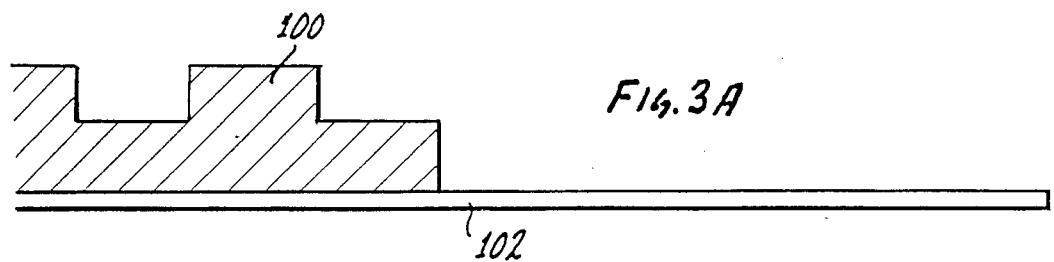
FIGS. 3A through 3D are sketches illustrating the progressive manufacturing steps of a preferred silicone debulking apparatus of the invention for use in debulking complex component parts.
Figure 3B:
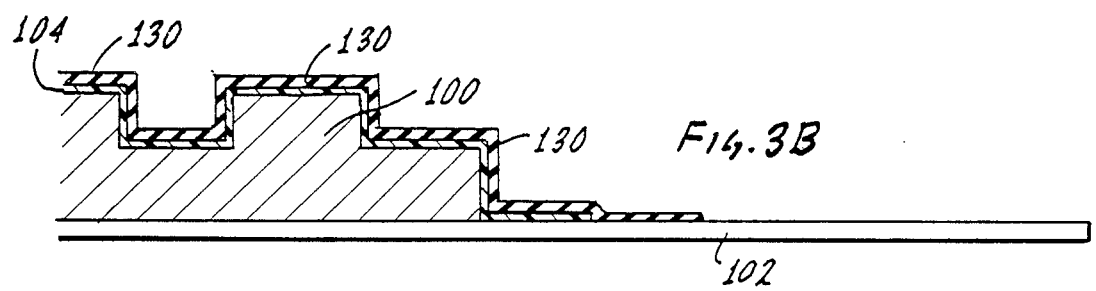
Figure 3C:
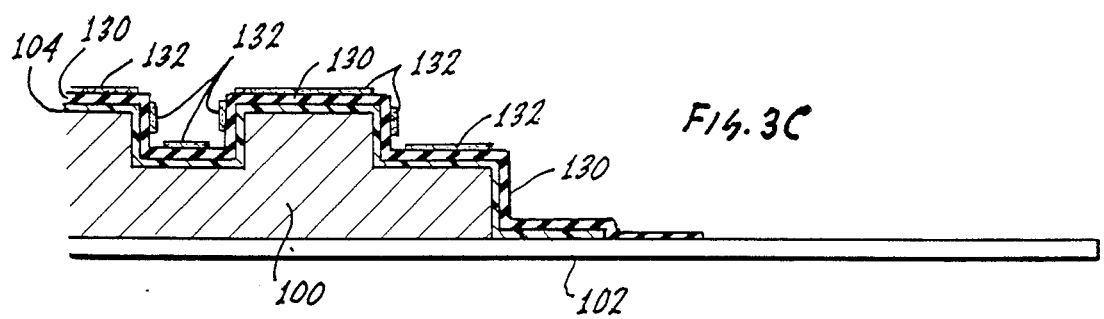

As depicted in FIG. 3C, the prepreg 132 is only located over those portions of the layer of silicone rubber 130 which overlay areas of the tool 100 which do not include male or female radii or the like. Thus, after the uncured silicone rubber of both the silicone layer 130 and the prepreg 132 are subsequently cured into an homogenous silicone rubber layer, the glass fiber of the prepreg 132 will only be positioned in those areas of the vacuum bag assembly 128 which do not include tight male or female radii. The finished vacuum bag asesmbly will be an envelope having a plurality of surfaces each of which is separated by an edge. The surfaces will include the fiber intimately encased within the cured silicone rubber of the cured bag. However along all edges, the bag will consist of only cured silicone rubber. The fibers will be absent from these edge portions. The fibers of the prepreg 132 do not stretch along their longitudinal axis and thus form reinforcing or stabilizing means for the rubber.

In FIG. 1 at process step 22 a single layer of prepreg 132 is overlaid onto the layer 130 of the uncured silicone rubber. At this point this assembly can be introduced back into the process stream of the previous embodiment at junction 28 and subjected to an autoclave curing at step 16 of the uncured silicone rubber of both the layer 130 of silicone and the silicone rubber inherent in the prepreg 132. This intimately combines the uncured rubber from both the layer 103 and the prepreg 132 into an integral cured rubber assembly.

As with the prior embodiment, the vacuum bag assembly 128 is then demolded at process step 18 and subjected to a postcure at process step 20. It is then ready to be mounted to the frame and membrane which have been preformed at process steps 44, 46 and 48 as previously described.

Also like the previous vacuum bag assembly 116, the vacuum bag assemby 128 includes a flange 134 for use in mounting it to a suitable cured rubber membrane equivalent to the membrane 122 of FIGS. 4 and 5. The membrane in turn can be mounted to a suitable frame, also as previously described.

Figure 3D:
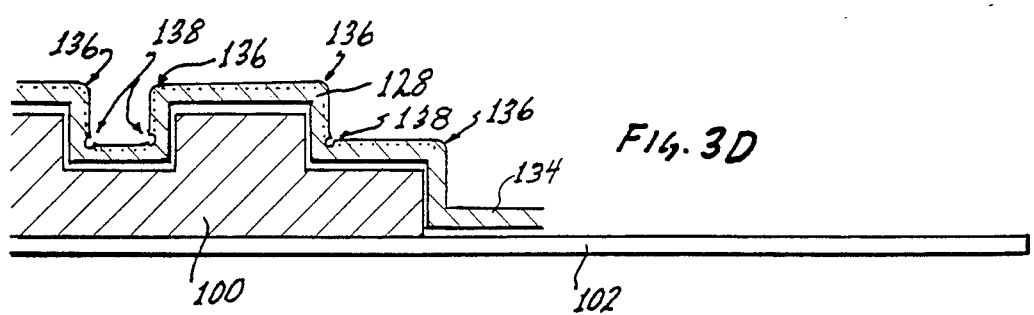

As is evident from FIG. 3D at both the male and female radii (edges) the walls of the vacuum bag assembly 128 are of a thickness which is slightly less than the thickness of the walls of the vacuum bag assembly 128 along the surfaces wherein the prepreg 132 are positioned. Because of this the vacuum bag assembly 128 is very flexible about each of the male and female radii.

As is seen in FIG. 6 a very complex shape can be molded for the vacuum bag assembly 128. This shape includes male radii typically shown by numeral 136 and female radii typically shown by number 138. It further includes undercut areas shown at 140 which are formed by negatively drafted walls shown at 142. Also, there is a general reentrant portion generally depicted in the area pointed to by the numeral 144.

Additionally evident from FIG. 6 is the fact that in the areas along both the male radii 136 and female radii 138 only the silicone rubber from the silicone rubber layer 130 is present. At the broad areas or surfaces in between these radii along flats and curves of the vacuum bag assembly 128 there is a layer of fabric 146 which is completely and initimately impregnated in and surrounded by cured silicone rubber.

The fabric 146 inhibits stretching of the vacuum bag assembly 128 in all those areas wherein it is present. However, since it is not located along either of the male and female radii, 136 and 138 respectively, the vacuum bag assembly 128 can stretch and flex along these areas. This assists in demolding the vacuum bag assembly 128 initially off of the tool 100 on which it is formed during initial formation of the vacuum bag assembly 128 as well as demolding it off of a composite part which will be formed on the tool during an actual production cycle.

Because the fabric 146 is not located along either of the male and female radii 136 and 138 these areas are incrementally thinner than the remainder of the vacuum bag assembly 128. As noted above, in forming the vacuum bag 128 a layer of 0.100" silicone rubber was utilized throughout the vacuum bag 128 with an additional 0.015" thickness of silicone rubber plus fabric at other areas. Thus inherently the thickness of the vacuum bag assembly 128 along both the male and female radii 136 and 138 is less than in the remainder of the vacuum bag assembly 128.

Alternately to using only a single layer of uncured silicone rubber and a single layer of prepreg, a second layer of silicone rubber 148 can be positioned in step 24 of FIG. 1 over the prepreg layer 132 as is depicted in FIG. 3C. This can then be bagged and cured as per process step 16 or as is depicted in FIG. 3D and at process step 26 of FIG. 1, a further layer of prepreg 150 can overlay the second layer of silicone rubber 148. Either of these composite structures are then reintroduced to main process sequence at junction point 28 and then bagged and cured as per assembly step 16 of FIG. 1 previously described.

For the embodiment depicted on the left hand branch of FIG. 1 and in FIGS. 3 and 6, at least one layer of silicone rubber and at least one layer of prepreg are utilized. For very large structures a further layer of silicone rubber and/or prepreg can be added to the structure.

Irrespective of whether a single silicone rubber and a single prepreg layer are used or additional layers are added thereon, for the embodiment of FIGS. 3 and 6 only a single silicone rubber cure is effected at process step 16. Further, a single demolding step at process step 18 is effected and a single postcure at process step 20 is effected. Thus, a vacuum bag assembly, as for instance the vacuum bag assembly 128, is constructed similar to the vacuum bag assembly 116 with the exception that at least one prepreg layer is utilized and alternately additional layers of silicone rubber and prepreg can be used.

In any event, the layup of the prepreg layer and additional layers of silicone rubber and prepreg can be done in a facilitated manner with little additional labor time expended in addition to that necessary for the layup up to and including process step 14 of FIG. 1. Both the curing of the silicone rubber at process step 16 and its postcure at process step 20 can be facilitated within one days time such that either of the vacuum bag assemblies 116 or 128 can be completely fabricated in about one days processing time. It is thus evident that the vacuum bag assemblies 116 and 128 are inherently superior with respect to processing time compared to other processing procedures which are more labor and/or time and/or energy intensive.

Figure 2C:
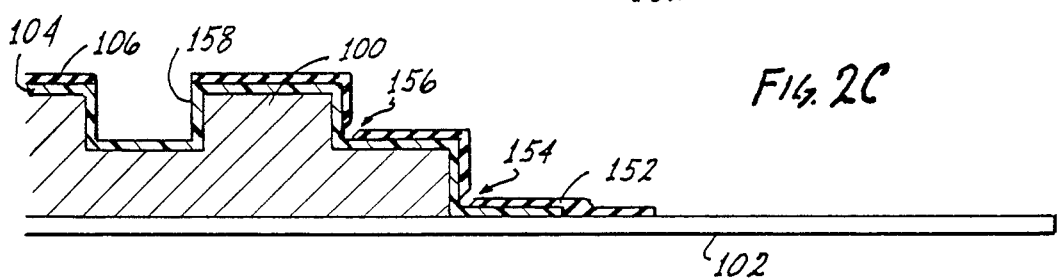
Figure 2D:
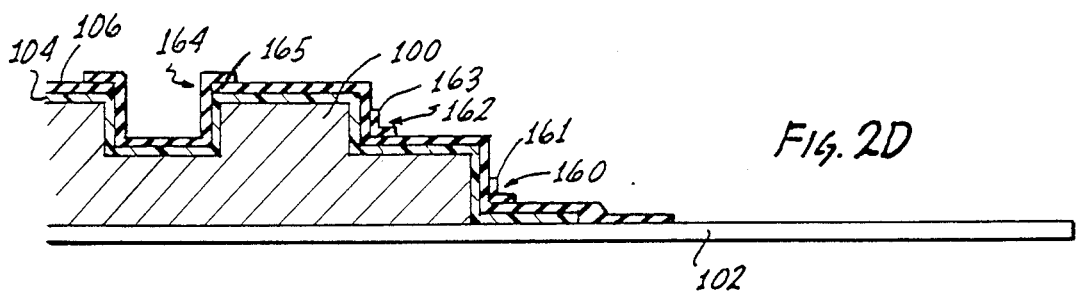
Figure 2E:
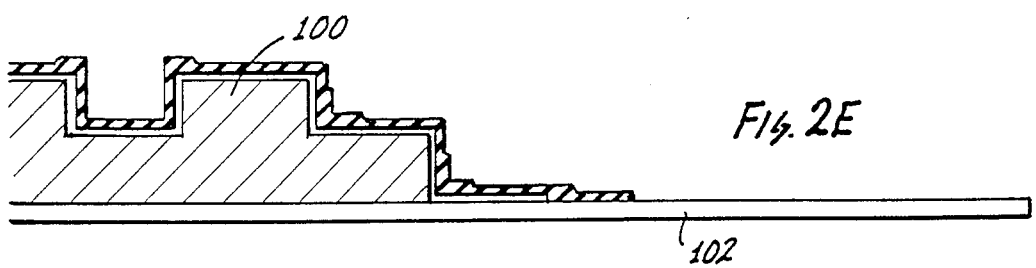

A further embodiment of the invention is depicted in FIGS. 2C through 2F and in the process steps along the right hand branch of FIG. 1. An additional vacuum bag assembly can be constructed for use on tools which have tight inside female radii. A vacuum bag assembly laid up as per steps 10, 12 and 14 of FIG. 1 is trimmed at step 30 by removing all female or inside radii and any recesses. These are cut-out and the edge chamfered as is shown in FIG. 2C. In doing this the flange area 152 remaining after cutting at radii 154 is sufficient for binding, in later process steps, to a silicone rubber membrane as was previously described for FIGS. 4 and 5. In addition to removing the radii 154, as is also shown in FIG. 2D, a further radii 156 is also removed as is recess 158.

The totality of the tool 100, the model 104 and the uncured silicone rubber remaining after removal of the radii and recesses is then covered with a teflon peel ply and breather ply and then vacuum bagged with a nylon film as was described in FIG. 2B. The film is sealed with a bead of chromate putty as was previously described and it is subjected to curing of the silicone rubber at cure step 32 of FIG. 1. The nylon film bag, the putty, the peel ply and the breather ply are removed and the partially formed rubber bag is then postcured either on the tool 100 or as loose parts. Postcuring, as before, is done in a regular oven at standard pressure and at a temperature of about 400° F. for about 4 hours. During this postcure the remaining pieces of rubber undergo a final shrinkage to stabilize the rubber against further shrinkage.

Alternately to first trimming at trim step 30, curing at cure step 32 and postcuring at cure step 34 of FIG. 1 the postcured vacuum bag assembly 116 at postcure step 20 of FIG. 1 could be trimmed at trim step 36 to remove the material along inside female radii and recesses.

In any event, whether the postcured assembly was trimmed at trim step 36 or a precured assembly was trimmed at trim step 30, the areas which have been removed are then filled in as is seen in FIG. 2D and step 31 of FIG. 1. At all areas where material was previously excised during trim, the areas are filled in to the existing cured rubber thickness with calendared B-stage rubber shown as material portion 160, 162, and 164 of FIG. 2D. The rubber fill strips 160, 162 and 164 are all uncured rubber either as a strip calendared sheet or as an uncured silicone rubber paste. Uncured silicone rubber splices cap 161, 163 and 165 are then applied over the edges of the filled in areas and the chamfered edge and overlap the outside surface of the un-excised previous post-cured rubber sections.

The entire bag is then covered with a peel ply, a breather ply and a nylon film as previously described and subjected to a second silicone rubber curing step, step 40 of FIG. 1. This is as per the previous cures done in an autoclave at, for instance 350° F. at 50 psi for 90 minutes.

Figure 2F:
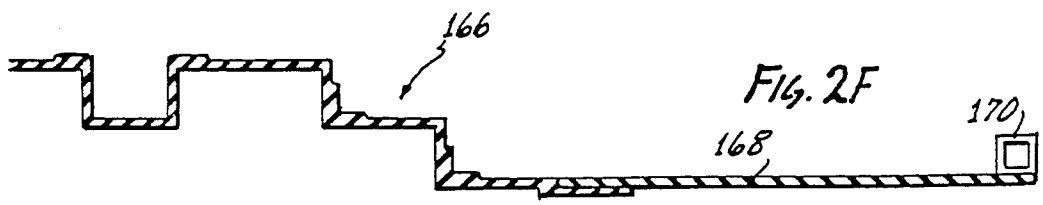

The assembly is then removed from the tool 1000 and model part 104 and the bag in a relaxed state is post-cured in an oven at ambient pressure at about 400° F. for at least 4 hours in postcure step 42 of FIG. 1. This second postcure step stabilizes the silicone rubber against any further shrinkage which could arise in any subsequent production use of the vacuum bag assembly 166 which has been formed and is seen in FIG. 2F. The vacuum bag assembly 166 is subsequently joined to a precured rubber membrane 168 and frame 170 as previously described.

For the embodiment of FIG. 2C through 2F it is generally preferred to do the trim at trim stage 30 on the initial uncured silicone rubber. As is evident from comparing FIG. 2F to FIG. 3D, in the embodiment of FIGS. 3 and 6 there is a paucity of material at the radii allowing for a lot of flexure of the bag of FIGS. 3 and 6 compared to an excess of material at the radii of the bag of FIGS. 2C through 2F. Because of this the bag of FIG. 3 and 6 is generally better adapted for use with very complex parts wherein the bag of FIGS. 2C through 2F is generally adapted for parts which may have female radii and recesses but which do not include severe undercuts, reentrant areas and the like.

For all of the vacuum bag assemblies of this invention the temperatures given above and below are intended to be approximate. The actual temperatures utilized for the manufacture of a molded vacuum bag assembly and apparatus of the invention are generally those used for forming epoxy composites reinforced with Fiberglas, Kevlar or graphite material. It is, of course, realized that the temperature conditions given can be relaxed, i.e. lowered, for bag assemblies to be utilized on composites such as polyester and Fiberglas which are cured at lower temperatures or they could be raised significantly for vacuum bag assemblies which are going to be utilized to cure laminates having a significantly higher cure temperature.

Typically the molded bag construction of the present invention contemplates autoclave temperatures of from about 250° F. to about 400° F. and pressures from about 50 to about 100 psi and postcure temperatures of from about 400° F. to 500° F. However, the invention is believed to be extendable to higher temperatures and pressures subject to the availability of suitable silicone rubbers or other materials incapable of degradation at such temperatures.

Preferredly the invention may be practiced at 350° F. and 50 psi for 90 minutes at the autoclave curing step and at 450° F. ambient pressure for 4 hours at the oven postcuring step. However, for some tool and part materials which are limited to lower temperature autoclaving operations, it may be necessary or advantageous to lower the temperature used in the autoclaving steps to a temperature such materials and tools can tolerate as, for instance, as low as 150° F. Generally, there is no need for the tool or model part to be present in the oven postcuring step which is preferredly done by placing the respective silicone bag unsupported on a rack in an oven.

The thicknesses required to form rubber bags in accordance with the present invention follow several criteria. Rubber bags which are not required to stretch over tool contours or which contain recesses or undercuts of large radius can be laid up with a single ply or uncured calendared rubber of about 0.100 inches or utilizing 2 ply laid up to 0.200 inches. When a fiber prepreg as, for instance, the prepreg 132 of the embodiments of FIGS. 3 and 6 is utilized with a single layer of silicone rubber, generally the silicone rubber will be about 0.100 inches and the prepreg about 0.015 inches. Each additional layer of uncured silicone rubber or prepreg will add an increment amount to the thickness of the ultimate vacuum bag assembly.

Typically for the embodiment of FIGS. 3 and 6, first and second layers of uncured silicone rubber will be utilized and they will include first and second layers of prepreg. Thus a layer of silicone rubber will be positioned immediately adjacent the tool or model part and covered with prepreg which in turn is covered by a further layer of silicone rubber which in turn is covered by the final layer of prepreg. When the totality of these layers are subject to the curing stage for curing the uncured silicone rubber, the multiple uncured silicone rubber layers, both the silicone layers themselves and the silicone within the prepreg layers, polymerize into a unified structure. This unified structure differs from prior art attempts to lay dry glass fabric onto a painted or sprayed on uncured silicone rubber in that in these attempted structures, the dried fabric tended to peel or delaminate from the remainder of the structure shortening the lifetime of or rendering useless any molding bags formed from such structures.

In each of the vacuum bag assemblies described, the flange on the vacuum bag assembly which is utilized to attach the vacuum bag assembly to the cured silicone rubber membrane should essentially be laid up in a single piece and where overlap existed this overlap should be blended to provide a smooth contoured bonding surface for ultimate bonding to the rubber membrane.

For each of the vacuum bag assemblies described herein prior to placement of the uncured calendared silicone rubber onto a model part or tool, normally a release agent would be liberally applied to the model or tool and any further part surfaces and air dried. Thereafter the calendared uncured silicone rubber sheets are contoured applied over the tool and/or models and generally smoothed out. Since calendared sheets of uncured silicone rubber are very pliable the sheets can be easily applied to all of the contours of the particular tool or model.

For each of the embodiments described, as used herein "silicone", "rubber", and "silicone rubber" are used interchangeably and refer to any of the silicone rubbers whether cured or uncured which generally meet the specifications set forth. The preferred silicone rubber, as used in accordance with this invention, will comply with Federal specification ZZ-R-765A, Table 2-3, for grades of 30, 50 and 60 shore. A copy of that specification table submitted in application Ser. No. 837,616 is herein incorporated by reference. Generally, silicone rubber of class 3-B having a hardness as of from abou 30 to 55 shore are preferred for use in the present invention. More specifically, grade 3-B 50 shore silicone rubbers are found quite satisfactory for the bag construction, exhibiting good elongation up to about 500% and possessing an excellent flex resistance to cracking. Silicone rubber that meets this criteria has a superior heat stability of 360° F. and a low initial temperature cure of 250° F.

These silicone rubbers exhibit certain characteristics which are essential to the performance of the molded bag apparatus of the present invention including a high heat resistance to allow continuous use in subsequent production cycles at 360° F. autoclave temperatures and do not exhibit additional hardening on use so that the bag will maintain flexibility and elongation. The silicone rubbers are further quite resistant to solvents and do not suffer any permanent damage from cleaning with MEK (methyl ethyl ketone) or acetone.

The silicone rubbers are easy to remove from component parts and are relatively self-releasing having a low peel resistance. They also possess improved durability and toughness exhibiting a tear strength in excess of 100 ppi. While shrinkage is the most critical factor involved with these rubbers, they are found to exhibit less than 2% shrinkage at 250° F. and a more modest additional 1% from that temperature to 400° F. The silicone rubbers generally can be cured at relatively low temperatures and pressure as, for example, 250° F. under vacuum and pressure of 50 psi and, once cured, they become impervious in normal autoclave operating pressures when used as a reusable vacuum bag. Commonly, they are found to have no leakage when used in an autoclave at 360° F. and 50 psi.

Examples of silicone rubbers of this type include the following which also lists typical materials for use in the manufacture of reusable bags in accordance with the present invention.

The following is a list of silicone rubber bag materials and supplies.

| Supplier | Description |
| --- | --- |
| Bondline Products (Norwalk, CA) or Dow Corning | Cured silicone rubber membrane sheet stock 48" wide, .085" thick, 50 shore (available from 010-.250"thick) |
| Bondline Products | Uncured (B-Stage) silicone rubber sheet stock 48" wide, .100" thick, 50 shore |
| Bondline Products | Uncured (B-Stage) silicone rubber sheet stock 48" wide, .250" thick, 50 shore |
| Mosite Rubber Co. (Fort Worth, TX) | Uncured (B-Stage) silicone rubber sheet Translucent sheet stock 48" wide, .100" thick |
| Fabercote Div of R & S Glass (Los Angeles, CA) | Double sided Red Glass reinforced silicone rubber, (B-Stage) prepreg, sheet stock 0.015" thick. (P/N 72121.528) |
| Bondline Products | 1" 50 shore silicone rubber extrusion |
| Bondline Products | 1" 30 shore silicone rubber extrusion |
| Bondline Products | 30 shore castable silicone rubber compound |
| Bondline Products | 40 shore castable silicone rubber compound |
| Bondline Products BP-104 | Silicone rubber release compound |
| or D Aircraft 10080 | Silicone rubber release compound |
| D Aircraft Dapercast 1-100 | High temperature thermo expanding casting compound |
| Dow Corning 96-083 | Two-part silicone adhesive, heat activated |
| Dow Corning Sylgard 577 | Primerless silicone adhesive base |
| Dow Corning Sylgard 577 | Primerless silicone curing agent |
| General Electric SS4044 | Clear silicone Primer |
| General Electric RTV 102 | One-part silicone Adhesive |

As used herein, shore hardness refers to the Shore A scale of hardness measurement.

Materials used as sealant adhesive and primers for attachment of the vacuum bag assemblies to a bonded cured rubber material or to appropriate metallic framework include materials as used to bond cured sheet materials together or to other materials such as steel, aluminum, nickel and epoxy tools.

GE RTV 102 is a white silicone RTV acetic acid liberating, one component moisture activated adhesive. It requires the use of SS4044 primery when bonding to steel or nickel. On most other materials, it requires no primer. The adhesive develops good bond strengths when properly moisture activated during drying at ambient conditions.

DC96-083 is a clear silicone, self-priming, two-part, peroxide activated, flowable liquid adhesive that requires heat curing. This adhesive is used when bonding cured silicone rubber plugs to tool surfaces for blending in tool contours where the GE RTV102 cannot be used due to the inability to develop a good bond resulting from adhesive confinement. DC96-083 develops very strong bonds with high peel resistance using very short heat cure periods of about thirty minutes at 302° F. to 350° F.

GE SS4044 is a clear liquid silicone primer. It is used to prime steel and nickel after they have been sandblasted with 35 grit sand. This primer is used with GE RTV102.

Bonding and splicing of silicone materials requires the same care and cleanliness normally associated with bonds using epoxy or other structural adhesives. Surfaces of those details that were to be bonded are to be first thoroughly cleaned and protected from airborne dust or other contaminants. Mixing of two component adhesives are closely controlled for the accuracy of weighing, blending and pot life control.

Complete curing of bonds is also critical. More caution and considerable time is required to assure completeness of cure where moisture activated RTV adhesive/sealants are used unlike the heat curing, two-part adhesives. During bonding operations, it is also necessary to provide a void free bondline to prevent the bag from leaking.

GE SS 4044 primer is suitable preparation for all silicone rubber materials and adhesives used in this invention. Its application is needed only for nickel and steel surfaces. After surfaces are prepared, primer is applied by brush or wiped to produce a wetted surface. Thickness build-up is undesirable and care is required to produce a wetted surface with minimum thickness build-up. After application, a minimum one hour cure at ambient is required before bonding.

For use as the rubber extrusion member 24 of FIGS. 4 and 5 and other like rubber extrusion members for the other embodiments a suitable silicone rubber extrusion as for instance 30 to 50 shore in a solid or rectangular cross section would be utilized. One side of this seal may be slightly concaved in which case this side is used to bond to the tool surface. The best appearance between the other two sides is used as the inside area of the seal.

The rubber extrusion 124 of FIGS. 4 and 5 as well as similar rubber extrusion for the other embodiments would be positioned as is best seen in FIG. 5 about 1.1 inches inside of the edge of the tool base 102. This allows a one inch frame member 120 to fit inside the periphery of the tool and protects the frame from abuse during service.

For use as the frame member 120, square one inch by one inch by ⅛ inch T aluminum tubing or other metallic tubing is used. As so positioned the frame 120 would be outside of the rubber extrusion 124 such that initially upon locating a vacuum bag assembly over a tool, the frame pulls the silicone membrane taut across the top of the seal giving an initial seal such that the vacuum pulled inside the seal pulls the rubber bag against the inside wall at 172 to seal the rubber membrane against the inside of the wall.

While the preferred and best mode of invention has been set forth in detail it should be mentioned that a sub combination form of the invention was recently constructed substantially of the same form as shown in FIGS. 4 and 5. This initial bag was made for operation in an oven at from about 250° F. to about 275° F. The bag was made in the same manner as is set forth in process steps 10, 12 and 14 of FIG. 1 except that the autoclave step 16 and postcure step 20 were not used. Rather, the uncured bag after being contoured over the tool was oven cured at a lower temperature for a couple of hours. In applications where the production part can be cured at such low temperatures, i.e. 250° F., and in a regular oven such a molded bag when molded in a silicone rubber membrane and frame is found to work satisfactorily and is included herein as an example of the minimum form of a molded bag apparatus which falls within the scope of the invention.

In operation any of the various embodiments of the invention are easily used. The laminates for parts are laid upon tools together with a tool ply, a bleeder ply to soak up excess resin and a breather ply as may be required. The vacuum bag assembly of the invention is then located over the tool, smoothed over the laminates and the other plies and then vacuum applied. The vacuum causes the external pressure to compress and debulk the laminate in a known manner. Bags made as per the teachings of this invention perform very satisfactorily in the above described steps and are reusable over many cycles as, for instance, 100 cycles for some parts.

To those skilled in the arts to which this invention pertains many modifications and adaptations will occur. For example, the present invention has been disclosed as especially useful for making molded rubber bags of silicone rubber. However, other elastomers can be molded in accordance with the procedures taught herein and at least certain of the improvements claimed will result. Examples of other elastomers which may be substituted for silicone rubber include fluorosilicones (Dow Corning) and acrylic elastomers (Cyanacryl - American Cyanimide, Vamac - Dupont).

What is claimed is:

1. A preshrunk molded bag for use in vacuum debulking and autoclaving operations in forming composite parts on a tool including a shaped mold on which the part is formed, said mold having first portions of relatively low curvature and second portions of high curvature with reentrant, tight inside radius, said second portions having much smaller surface extent than said first portions, said bag comprising:

a molded blanket of silicone rubber formed about said mold to form said bag, said bag being of dimensions to fully cover said mold and to fully conform to said mold shape and dimensions throughout said first and second portions without stretching and further being fully preshrunk throughout, said bag being formed from a plurality of preshrunk segments partially forming a bag and formed by laying panels of uncured silicone rubber shaped on the tool to form the major segments of a bag; said bag having gaps or removed portions forming gaps at the second portions in the tool configuration, said major segments being cured by vacuum bagging and autoclaving at an elevated temperature and pressure, and subsequently stabilized by post curing at a temperature greater than the autoclave temperature for a time sufficient to stabilize said segments from shrinking to form a partially completed, preshrunk bag, strips of initially uncured silicone rubber bridging in the gaps between and connecting said cured major segments across said second portion into a unitary, complete bag structure completely covering the mold, said bag structure thereafter being cured by vacuum bagging and autoclaving at elevated temperature and pressure, and then stabilized by post curing the same at a temperature greater than that of the autoclave temperature so as to form a unitary structure, a flange of preshrunk, silicone rubber extending about said bag, a cured, preshrunk silicone rubber membrane having a cutout therein for passing said bag through said cutout, said flange being constructed and arranged to form an overlap with the membrane about the entire bag, and sealing means disposed between the flange and the membrane, said bag, flange, and membrane being constructed to be vacuum tight.

2. A preshrunk molded bag for use in vacuum debulking and autoclave operations in the manufacture and curing of composite parts on a tool including a shaped mold on which the part is formed, said mold having first portions of relatively low curvature and second portions of high curvature, said second portions having much smaller surface extent than said first portions, said bag comprising:

a molded blanket of elastomer formed about said mold to form said bag, said bag being of dimensions to fully cover said mold and to fully conform to said mold shape and dimensions throughout said first and second portions without stretching and further being fully preshrunk throughout, said bag being formed from a plurality of cured, preshrunk, and stabilized panels of elastomer covering said tool over said first portions and extending over all of said tool except said second portions to form a partial bag structure, and strips of uncured sheet elastomer bridging the cured panels across the second portions and interconnecting said panels into a unitary, complete bag structure for completely covering the mold, said strips being cured and shrink stabilized together with the panels after which said entire bag is substantially fully preshrunk and has the shape of the full dimensions of the tool.

3. The molded bag as in claim 2 further including means forming a preshrunk elastomeric flange extending outwardly about the base of the shaped portion of the mold, a precured, stabilized elastomeric membrane having a cutout for receiving said bag with the flange overlapping the membrane about said cutout, and means sealing the membrane and flange together at the overlap, said bag, flange, and membrane being constructed to be vacuum tight.

4. The molded bag as in claim 2 further including fabric reinforcing means incorporated in said panels.

5. The molded bag of claim 4 in which said reinforcing means is a fibrous fabric embedded in a silicone rubber matrix.

6. The molded bag of claim 4 wherein said reinforcing means is selected as a prepreg of fiberglass in an uncured matrix of silicone rubber.

7. The molded bag of claim 6 wherein said prepreg is selected as a calendared sheet.

8. The molded bag as in claim 2 further including a frame, a cured elastomeric membrane supported on said frame and having a cut-out therein for passing said bag through said cut-out, said bag being constructed and arranged to form an overlap between the envelope and the membrane about the entire blanket, sealing means disposed between the bag and the membrane.

9. A molded bag as in claim 2 in which said bag includes a flange of rubber extending thereabout, a cured silicone rubber membrane having a cut-out therein for passing said bag through said cut-out, said flange being constructed and arranged to form an overlap with the membrane about the entire bag, and sealing means disposed between the flange and the membrane.

10. A preshrunk molded bag for use in vacuum debulking and autoclaving operations in forming composite parts on a tool including a shaped mold on which the part is formed, said mold having first portions of relatively low curvature and second portions of high curvature with reentrant, tight inside radius, said second portions having much smaller surface extent than said first portions, said bag comprising:

a molded blanket of silicone rubber formed about said mold to form said bag, said bag being of dimensions to fully cover said mold and to fully conform to said mold shape and dimensions throughout said first and second portions without stretching and further being fully preshrunk throughout, said bag being formed from a plurality of preshrunk panels partially forming a bag and formed by laying portions of uncured silicone rubber shaped on the tool to form the major segments of a bag; said bag having gaps or removed portoins forming gaps at all tight inside radiuses and recesses in the tool configuration, said major segments being cured by vacuum bagging and autoclaving at an elevated temperature and pressure, and subsequently stabilized by post curing at a temperature greater than the autoclave temperature for a time sufficient to stabilize said segments from shrinking to form a plurality of panels of a partially completed, preshrunk bag, strips of initially uncured silicone rubber bridging in the gaps between and connecting said cured major segments into a unitary, complete bag structure for completely covering the mold, said bag structure thereafter being cured by vacuum bagging and autoclaving at elevated temperature and pressure, and then stabilized by post curing the same at a temperature greater than that of the autoclave temperature so as to form a unitary structure.

11. A molded bag as in claim 10 in which said bag includes a flange of rubber extending thereabout, a cured silicone rubber membrane having a cut-out therein for passing said bag through said cut-out, said flange being constructed and arranged to form an overlap with the membrane about the entire bag, and sealing means disposed between the flange and the membrane.

* * * * *